UNITED STATES PATENT OFFICE 2,228,222

PLASTICIZED CELLULOSE ETHER COMPOSITIONS

Shailer L. Bass, Midland, Mich., assignor to The Dow Chemical Company, Midland, Mich., a corporation of Michigan No Drawing. Application April 1, 1939, Serial No. 265,524

7 Claims. (Cl. 106—40)

This invention concerns certain new plastic compositions comprising cellulose ethers plasticized with tri-(para-tertiaryoctylphenyl) phosphate, a compound having the formula:

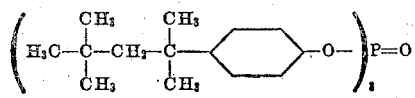

The tri-(para-tertiaryoctylphenyl) phosphate is a high-boiling viscous liquid compound (boiling point approximately 361°–365° C. at 12.5 millimeters absolute pressure), which may be prepared by reacting three moles of para-tertiary-octylphenol with one mole of phosphorus oxychloride in the manner usual for the preparation of other triaryl phosphates.

Cellulose ethers are known to possess a combination of properties, such as low flammability, exceptional stability against hydrolysis or deterioration on aging, etc., which renders them desirable plastic materials for the preparation of films, lacquers, molded articles, etc. In preparing such products from any cellulose derivative, e. g. cellulose nitrate or a cellulose ester or ether, a plasticizing agent is usually incorporated for the purpose of rendering the material more readily moldable at elevated temperatures or to lend certain characteristics, such as increased toughness, pliability, or elasticity, etc., to the final product.

Most plasticizers have the effect of lowering the yield point, tensile strength, and hardness of a cellulose derivative, and these effects become more pronounced as the proportion of plasticizing agent is increased. Accordingly, care must be taken in plasticizing cellulose derivatives to select a plasticizing agent which may be employed in a proportion sufficient to lend the desired pliability or moldability, etc., to the compositions without unduly softening or weakening them.

The cellulose ethers are inherently softer, tougher, and more ductile than cellulose nitrate or other cellulose esters wherein the hydroxyl groups of the original cellulose are replaced to like extent; hence, the problem of finding agents to plasticize cellulose ethers without excessively softening or weakening them is particularly difficult. When unplasticized, the cellulose ethers are sufficiently hard for most purposes, but the presence of a plasticizing agent is required when they are to be molded. However, most known plasticizers, when employed in the proportions necessary to obtain satisfactory plasticity, soften the ethers to such extent as to render them unsuited for the preparation of molded articles which must resist wear, e. g. buttons, combs, etc. There are a few plasticizing agents which, though not tending to soften the cellulose ethers unduly, are not sufficiently compatible with the ethers to permit their use in proportions sufficient to produce the desired plasticity. Accordingly, in preparing molding compositions from the cellulose ethers, it has heretofore been necessary to employ mixtures of different plasticizing agents in carefully controlled proportions in order to obtain molded articles of satisfactory hardness. Only a few such mixtures of plasticizing agents are known. In so far as we are aware, no single compound which may be used to plasticize cellulose esthers and produce a satisfactorily hard molding composition has heretofore been known.

I have discovered that tri-(para-tertiaryoctylphenyl) phosphate is such a plasticizing agent. As hereinbefore pointed out, it is a high-boiling compound which remains liquid at room temperature. It is mutually soluble in nearly all proportions with the cellulose ethers and is also soluble in most solvents (e. g. aromatic hydrocarbons and chlorinated hydrocarbons such as benzene, toluene, xylene, chlorobenzene, ortho-dichlorobenzene, chloroform, ethylene chloride, etc., and their mixtures with alcohols, esters, and ketones) commonly used as lacquer solvents. It does not tend to separate from the cellulose ethers on standing. Furthermore, it may be incorporated in large proportion with a cellulose ether without unduly softening or weakening the latter. In fact, the plasticized ethers are in some instances harder than the cellulose ether alone at room temperature. Tri-(para-tertiaryoctylphenyl) phosphate, even when added in small proportion to a cellulose ether, permits the latter to be molded without difficulty. Another advantage of using tri-(para-tertiaryoctylphenyl) phosphate as the plasticizing agent is that the plasticized composition, after being molded at an elevated temperature, hardens very rapidly on cooling the mold. This property renders the new compositions well-suited to use in the known injection molding process, wherein it is essential for rapid handling of the material that the molded articles be hardened immediately after formation so that they may be ejected from the mold. Furthermore, when separate streams of the composition meet during molding, they knit well together forming a seamless piece. This property is of importance in injection molding coatings over solid objects or in molding around mold cores.

The cellulose ethers employed according to the invention are preferably etherified sufficiently to render the same soluble in the organic solvents hereinbefore mentioned and suitably contain two or more etherified hydroxyl groups per anhydroglucose unit. Among the various cellulose ethers which may be used are ethyl cellulose, isopropyl cellulose, n-propyl cellulose, butyl cellulose, ethyl butyl cellulose, ethyl lauryl cellulose, benzyl cellulose, ethyl benzyl cellulose, etc.

The tri-(para-tertiaryoctylphenyl) phosphate may be incorporated with cellulose ethers in any of the usual ways, e. g. by mixing it with the ether and kneading or rolling the mixture at elevated temperatures, by dissolving it and the ether in a mutual solvent and thereafter removing the solvent, etc. Where the plasticized composition is to be used for molding purposes, e. g. the molding of cups, combs, buttons, etc., it preferably, although not necessarily, is prepared in the absence of solvents as follows: A cellulose ether is mixed with the desired proportion of tri-(para-tertiaryoctylphenyl) phosphate, and the mixture is passed repeatedly through heated compounding rolls until a homogeneous composition is obtained. Usually temperatures from 100° to 160° C. produce a workable composition. The proportion of tri-(para-tertiaryoctylphenyl) phosphate in such composition may correspond to between 10 and 25 per cent of the weight of the cellulose ether, but is usually between 12 and 15 per cent on the same basis. The plasticized composition may be molded by either the compression molding method or the injection molding method without difficulty.

When sheets or films are to be produced, the composition is preferably prepared by dissolving a cellulose ether in a volatile solvent which is also capable of dissolving the tri-(para-tertiaryoctylphenyl) phosphate and adding the latter in the proportion necessary to give the desired plastifying effect, usually in a proportion representing from 5 to 40 per cent of the weight of the ether. The resultant solution which preferably is quite viscous, may be spread on an even surface and the solvent evaporated to leave a sheet, or it may be drawn directly into films or threads under conditions which provide for rapid evaporation of the solvent. The films so produced are clear and transparent and are nearly as hard, and in some instances harder, than the cellulose ether alone.

plasticizer in a cellulose ether without softening or weakening the latter appreciably. For purpose of comparison, the properties of the unplasticized cellulose ether and of the cellulose ether plasticized with the previously known plasticizing agents, triphenyl phosphate and tricresyl phosphate, are also given. The procedure in carrying out the tests was as follows: Ethyl cellulose was dissolved in a mixed solvent consisting of 80 parts by volume of toluene and 20 parts of ethanol to form an approximately 15 per cent by weight solution thereof. The phosphate specified in the following table was added in the proportion stated and the resultant solution was drawn into films in accordance with the procedure described in Ind. and Eng. Chem. 29, 681 (1937). Each proportion of plasticizer is given in terms of per cent of the weight of ethyl cellulose employed. The film so obtained possessed the yield point in kilograms tension per square centimeter cross section of film, the tensile strength in the same units, and the hardness index number given in the table. By "hardness index number" is meant the hardness of the film expressed as per cent of the hardness of an unplasticized but otherwise similar film of ethyl cellulose. In determining such hardness index number, each film of known dimensions was subjected to a gradually increased tension until the film had been stretched well beyond its limit of elasticity and the "yield point" determined. The term "yield point" refers to the kilograms of tension per square centimeter of original cross section of film at which the deformation of the latter increases rapidly without increase in the tension. In other words, it is the stress at which stress increments are entirely absorbed by stretching. Hardness is usually measured by the amount of deformation under a given load. Since the "yield point" of all of these films occurred at practically identical deformation, or percentage elongation, it was used as a basis for comparing their relative hardness. The tensile strength is the tension, in kilograms per square centimeter of original cross section of the film, sustained at the point of rupture. The per cent elongation is the per cent of the original length of a film by which it may be elongated under tension before breakage occurs.

*Table I*

| Exp. No. | Plasticizer | | Yield point, kg./cm.² | Tensile strength, kg./cm.² | Per cent elongation | Hardness index No. |
|---|---|---|---|---|---|---|
| | Kind | Per cent | | | | |
| 1 | None | | 475 | 630 | 30 | 100 |
| 2 | Triphenyl phosphate | 15 | 350 | 475 | 30 | 74 |
| 3 | ----do---- | 40 | 120 | 120 | 32 | 25 |
| 4 | Tricresyl phosphate | 15 | 320 | 525 | 47 | 67 |
| 5 | ----do---- | 40 | 100 | 130 | 36 | 21 |
| 6 | Tri-(para-tertiaryoctylphenyl) phosphate | 15 | 520 | 610 | 30 | 109 |
| 7 | ----do---- | 40 | 435 | 570 | 38 | 91 |

The following examples illustrate certain ways in which the principle of the invention has been applied and demonstrate some of the advantages of the invention, but they are not to be construed as limiting the invention.

*Example 1*

The purpose of this example is to show that tri-(para-tertiaryoctylphenyl) phosphate may be incorporated in widely varying proportions as a From the foregoing Table I it will be seen that whereas the previously known plasticizers triphenyl phosphate and tricresyl phosphate, decreased very markedly the yield point, strength, and hardness of the ethyl cellulose, tri-(para-tertiaryoctylphenyl) phosphate had relatively little effect on these properties.

*Example 2*

Three different granular plasticized ethyl cellulose compositions containing 75.8 per cent by weight of ethyl cellulose (having an ethoxyl content of 48.5 per cent by weight, i. e. containing about 2.5 etherified hydroxyl groups per anhydroglucose unit), 22.7 per cent of the plasticizer specified in Table II below, and 1.5 per cent of Montan wax, were prepared by mixing the ingredients in the presence of sufficient solvent (consisting of 2 parts by volume of benzene and part of methanol) to form a viscous doughy mass and then evaporating the solvent. Each plasticized composition was compression molded at a temperature of about 205° C. under a pressure of 7 tons per square inch into a test piece of dimensions 0.5 inch x 0.5 inch x 4 inches and the hardness at room temperature of each molded piece was determined. All of the molding operations were carried out without difficulty, the flow characteristics of all three plasticized compositions being excellent. Table II names the plasticizer in each composition and gives the Shore scleroscope hardness of the test piece molded therefrom.

*Table II*

| Plasticizer | Shore hardness |
| --- | --- |
| Triphenyl phosphate | 41 |
| Tricresyl phosphate | 47 |
| Tri-(para-tertiaryoctylphenyl) phosphate | 68 |

Advantages similar to those demonstrated in the foregoing examples are obtained by using tri-(para-tertiaryoctylphenyl) phosphate as the agent for plasticizing other cellulose ethers, e. g. propyl cellulose, butyl cellulose, benzyl cellulose, ethyl benzyl cellulose, etc. In all such instances, this phosphate may be used to improve markedly the molding characteristic of the cellulose ether without excessively softening or weakening the latter.

The new plastic compositions may contain ingredients other than those hereinbefore stated. For instance, in addition to tri-(para-tertiaryoctylphenyl) phosphate other plasticizing agents such as dibutyl phthalate, triphenyl phosphate, etc., may also be present. Furthermore, dyes or pigments may be incorporated with the plastics to produce objects of desired color or shade and, if desired, fillers, e. g. inert substances such as powdered silica, wood flour, etc., may be incorporated in the plastic compositions to increase the bulk thereof.

Other modes of applying the principle of the invention may be employed instead of those explained, change being made as regards the compositions herein disclosed, provided the ingredient or ingredients stated by any of the following claims or the equivalent of such stated ingredient or ingredients be employed.

I therefore particularly point out and distinctly claim as my invention:

1. A plastic composition comprising ethyl cellulose plasticized with between about 5 and about 40 percent of its weight of tri-(para-tertiaryoctylphenyl) phosphate.

2. Ethyl cellulose plasticized with between about 5 and about 40 per cent of its weight of tri-(para-tertiaryoctylphenyl) phosphate.

3. A molded article comprising a cellulose ether plasticized with between about 10 and about 25 per cent of its weight of tri-(para-tertiaryoctylphenyl) phosphate.

4. A molded article comprising ethyl cellulose plasticized with between about 10 and about 25 per cent of its weight of tri-(para-tertiaryoctylphenyl) phosphate.

5. A transparent film comprising a cellulose ether and, as the principal plasticizing ingredient therefor, tri-(para-tertiaryoctylphenyl) phosphate in amount corresponding to between about 5 and about 40 per cent of the weight of the cellulose ether.

6. A transparent film comprising ethyl cellulose and, as the principal plasticizing ingredient therefor, tri-(para-tertiaryoctylphenyl) phosphate in amount corresponding to between about 5 and about 40 per cent of the weight of the ethyl cellulose.

7. A plastic composition comprising a cellulose ether and tri-para-tertiaryoctylphenyl phosphate in amount corresponding to between about 5 and about 40 per cent of the weight of the ether.

SHAILER L. BASS.